US006828515B2

(12) United States Patent
Aumard

(10) Patent No.: US 6,828,515 B2
(45) Date of Patent: Dec. 7, 2004

(54) PROOF BODY AND WEIGHING APPARATUS PROVIDED WITH SUCH PROOF BODIES

(75) Inventor: Jean-Pierre Aumard, Etrembieres (FR)

(73) Assignee: S.C.A.I.M.E. S.A., Annemasse (FR)

( * ) Notice: Subject to any disclaimer, the term of this patent is extended or adjusted under 35 U.S.C. 154(b) by 44 days.

(21) Appl. No.: 10/360,629

(22) Filed: Feb. 10, 2003

(65) Prior Publication Data

US 2003/0159858 A1 Aug. 28, 2003

(30) Foreign Application Priority Data

Feb. 27, 2002 (EP) .............................. 02004476

(51) Int. Cl.[7] .............................. G01L 1/04; G01G 3/14
(52) U.S. Cl. .................. 177/211; 177/229; 73/862.634; 73/862.639
(58) Field of Search ..................... 73/862.632, 862.633, 73/862.634, 862.638, 862.639; 177/211, 229, DIG. 9

(56) References Cited

U.S. PATENT DOCUMENTS

| 4,146,864 | A | * | 3/1979 | Bethe ............................. 338/5 |
| 4,411,327 | A | * | 10/1983 | Lockery et al. ............. 177/211 |
| 4,454,771 | A | * | 6/1984 | Shimazoe et al. ........ 73/862.68 |
| 5,024,107 | A | * | 6/1991 | Bethe ..................... 73/862.622 |
| 5,438,883 | A | * | 8/1995 | McLean ................. 73/862.632 |
| 5,700,982 | A | * | 12/1997 | Neuman ...................... 177/229 |
| 5,801,339 | A | * | 9/1998 | Boult .......................... 177/261 |
| 6,417,466 | B2 | * | 7/2002 | Gross et al. ................. 177/211 |

FOREIGN PATENT DOCUMENTS

| EP | 0 670 480 | 9/1995 |
| EP | 0 984 251 | 3/2000 |

* cited by examiner

Primary Examiner—Randy W. Gibson
(74) Attorney, Agent, or Firm—Young & Thompson

(57) ABSTRACT

The proof body for a weighing apparatus is comprised of a profiled segment and it includes a measuring beam (9) joined at each one of its ends to a respective wing (10a, 10b) which extend substantially perpendicularly to the measuring beam (9) and of which the free side faces (11a, 11b) provide abutment faces. It further includes an abutment beam (13) which is parallel to the measuring beam (9) and which is connected thereto via two ribs (14), this abutment beam (13) being also connected to each one of the wings (10a, 10b) by a web (15) which is substantially parallel to the measuring beam (9). Under such circumstances, a strain gauge (18) affixed beneath the measuring beam (9) is subjected only to contraction strains when a force is applied beneath the abutment beam (13).

6 Claims, 3 Drawing Sheets

PROOF BODY AND WEIGHING APPARATUS PROVIDED WITH SUCH PROOF BODIES

The object of the present invention is a proof body for a measuring sensor designed for a weighing apparatus and, more particularly, for bathroom scales, as well as a weighing apparatus provided with such proof bodies. For such an application, it is important that a sensor be available, which is reliable and inexpensive.

Generally, these weighing apparatuses include measuring sensors comprising a proof body shaped as a deformable parallelogram carrying strain gauges in its hinge regions. This implies that the strain gauges be capable of resisting both to a traction and to a compression and necessitates the use of strain gauges which are expensive.

Quite inexpensive strain gauges are available which can be mass-produced and which consist of a thin glass substrate on which are formed by deposition metallised areas forming resistors, of which the resistance varies as a function of the deformation of the substrate The drawback of these strain gauges lies in the fact that they offer a resistance to deformation by traction which is poor.

One of the purposes of the present invention is to provide a proof body for weighing apparatuses in which the strain gauges are subjected only to compression deformations and strains, so that inexpensive strain gauges, such as those described above or any other type of gauge may be used without affecting adversely the reliability and the useful life of the weighing apparatus.

The object of the present invention is a proof body for a weighing apparatus and a weighing apparatus, in particular bathroom scales, equipped with such proof bodies, which are characterised by the features set forth in claims 1 and 3.

The appended drawing illustrates schematically and by way of example, an embodiment of the proof body, according to the invention, and its use in a weighing apparatus.

Figure 1:
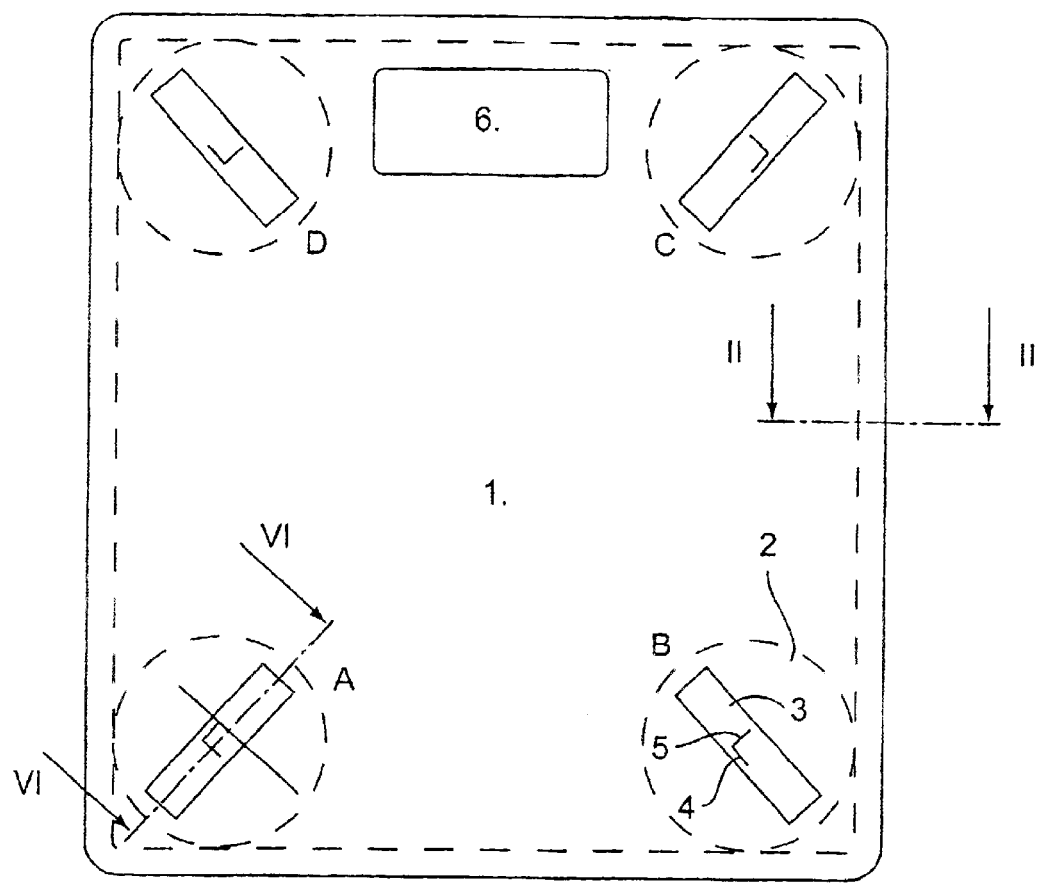
FIG. 1 represents schematically a weighing apparatus seen in a plan view illustrating the positioning of the proof body.
Figure 2:
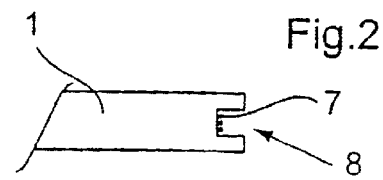
FIG. 2 is a cross-sectional view taken along line II—II of FIG. 1.

FIG. 1 of the appended drawing illustrates schematically a weighing apparatus, here bathroom scales, equipped with four proof bodies according to the invention. These bathroom scales are comprised of a plate 1 provided on its lower surface with four feet 2, each one of these feet carrying a proof body 3 provided with at least one and, preferably, two variable resistors 4, 5 arranged orthogonally on a substrate fixed to the proof body 3.

In the example illustrated, the proof bodies 3 are disposed along the diagonal lines of the plate 1, but in other embodiments, they can be disposed, for example, each one parallel to one side of the plate 1 or parallel to two facing sides of this plate 1. Preferably, these proof bodies are disposed along directions which are orthogonal or parallel with respect to each another.

The plate 1 is provided on its upper face with a display 6, for example a liquid crystal display, connected to the strain gauges 4, 5 of the proof body 3, by means of leads 7 housed in grooves 8 of the plate 1, cut out in its lower face and/or in its periphery.

As will be described later, each proof body 3, which is housed in a foot 2 of the weighing apparatus, is formed as a profiled segment, illustrated in FIG. 4.

This proof body 3 includes a measuring beam 9 which is joined at its ends to the end walls 10a, 10b, of which the upper side faces 11a, 11b provide abutments abutting directly or indirectly against the lower face 12 of the plate 1 of the weighing apparatus.

This proof body 3 further includes an abutment beam 13 which is parallel to the measuring beam and which is connected to this measuring beam by the ribs 14 and to the end walls 10a, 10b, by the thin webs 15.

As will be seen later, this proof body is housed in a foot 2, in such a manner that the support part of the foot in contact with the ground or any other surface, acts as a support for the abutment beam 13, via a ball 16.

Figure 4:
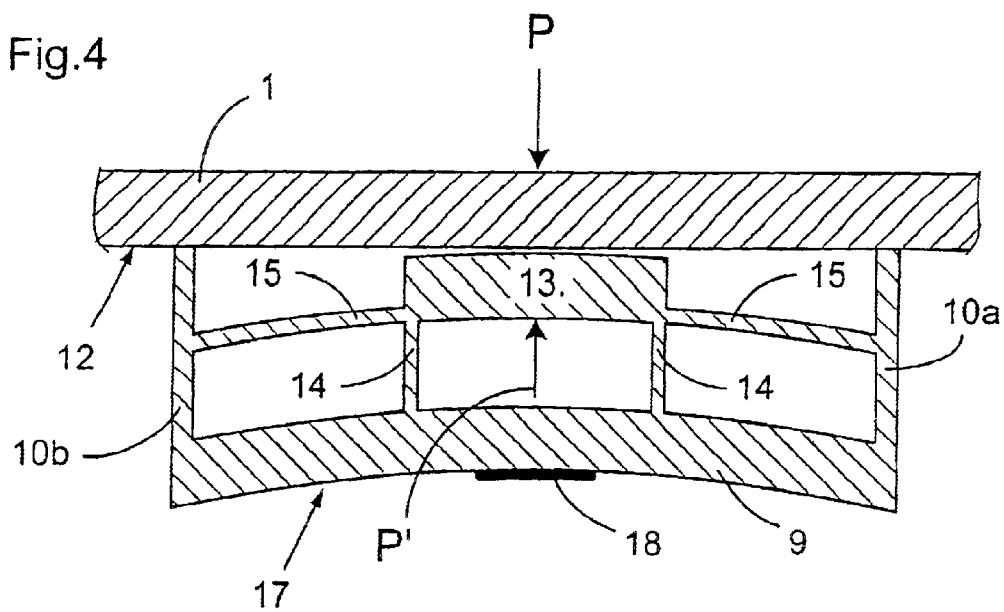
FIG. 4 is a side view of the proof body, fastened to the plate of a weighing apparatus, in a position in which it is strained by the effect of a weight P applied on the plate.
Figure 6:
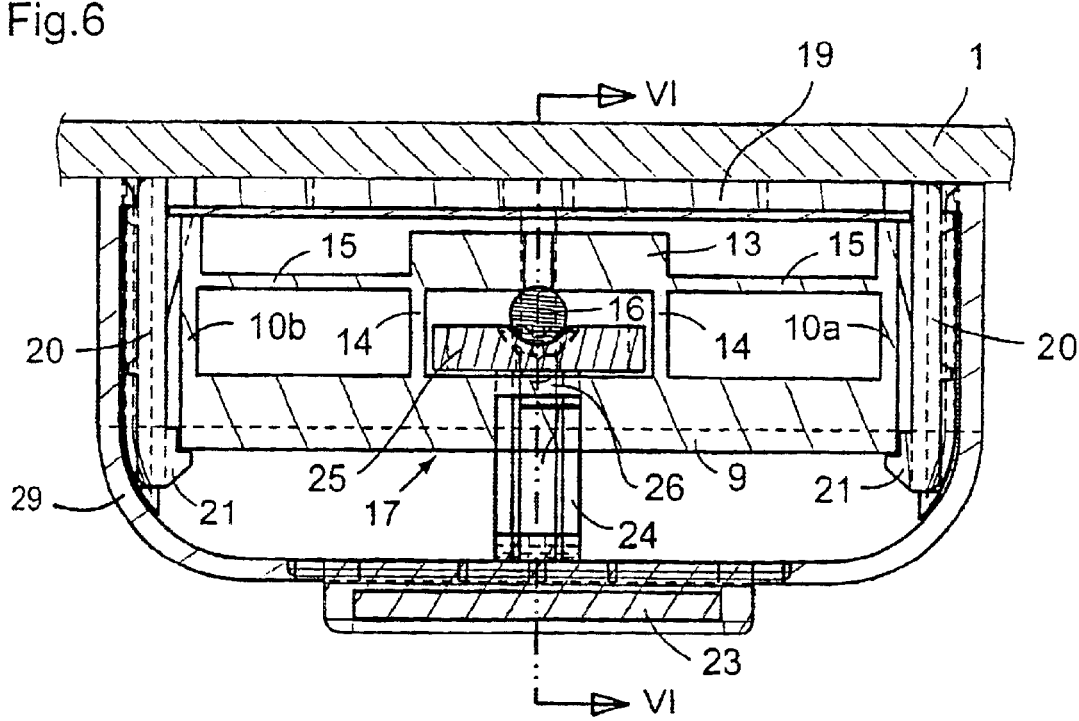
FIG. 6 is a cross-sectional view taken along line VI—VI of FIG. 1.
Figure 7:
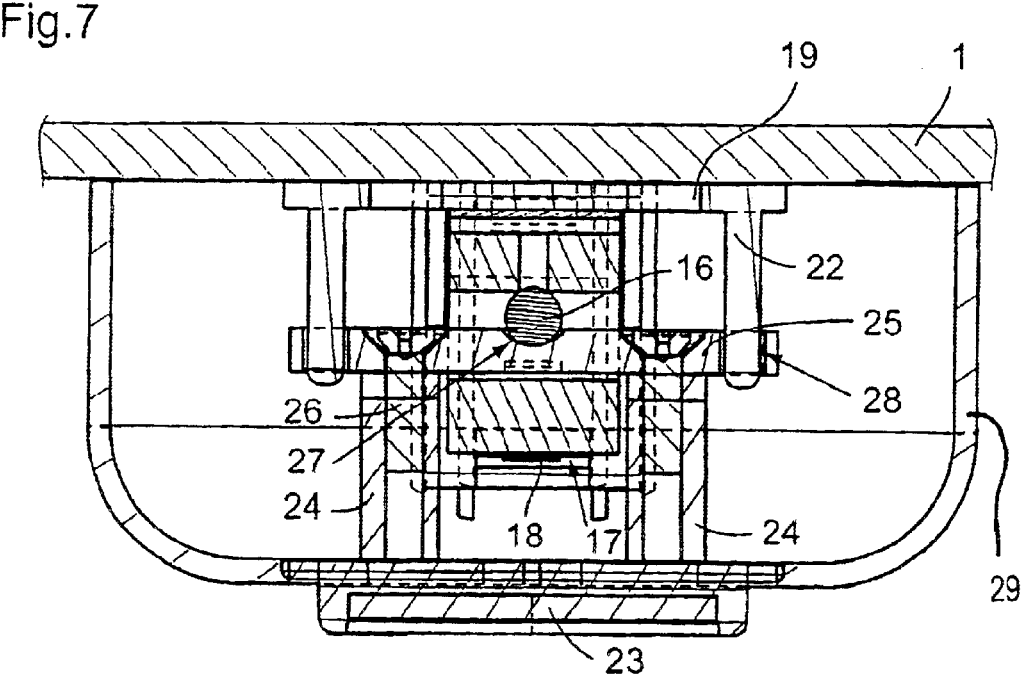
FIG. 7 is a cross-sectional view taken along line VII—VII of FIG. 6.

Accordingly, and as illustrated in FIG. 4, when a force P is applied upon the plate 1, a reactive force P' acts on the abutment beam 13 from beneath. This reactive force tends to deform the measuring beam, thorough an upward motion of its median part between the supports 10a, 10b. Accordingly, the lower face 17, upon which is affixed a strain gauge 18, can only be subjected to compression strains and, accordingly, it is possible to use strain gauges on a fine glass substrate. The strain gauge 18 can be of any type desired. However, the proof body makes it possible to use gauges which are fragile in compression.

The foot 2 includes a fastening/guiding piece designed for being affixed beneath the plate 1, for example via an adhesive. This fastening/guiding piece includes a base plate 19 which abuts against the lower face of the plate 1 and two wings 20 extending substantially perpendicularly to this base plate, the ends of said wings being provided a hook 21. The distance between the hooks 21 corresponds to the length of the proof body 3 and the distance between the hooks 21 and the base plate 19 corresponds to the height of the proof body 3.

Accordingly, the proof body 3 can easily be introduced between the wings 20 and held in the service position by the hooks 21. A steel blade 22 is provided in the example illustrated between the abutment faces 11a, 11b of the proof body 3 and the base plate 19 of the fastening/guiding piece 19, 20 in order to ensure a satisfactory abutment of the proof body 3.

This fastening/guiding piece includes furthermore two guiding rods 22 extending perpendicularly with respect to the base plate and these guiding rods 22 are substantially aligned along a direction perpendicular to a plane, which, in turn, is perpendicular to the wings 20 and which lies in a substantially median position between these wings. These rods or guides 22 are spaced apart by a distance which is greater than the width of the proof body 3 and they extend on both sides thereof when it is affixed to the base plate 19 between the wings 21.

Further, the foot includes a base or a shoe 23 which is designed for coming in contact with the ground or with a support surface and which has two columns 24 extending substantially perpendicularly with respect to the surface of the shoe 23. These columns 24 are threaded internally, which makes it possible to mount a strut 25 by means of screws 26 on these columns. The strut 25 traverses the proof body 3 transversally, extending through the space comprised between the measuring beam 9, the abutment beam 13 and the ribs 14. This strut has a recess 27 for receiving the ball 16. This strut 25 further includes bores 28 in the vicinity of its ends, which bores receive the guiding rods 22 of the fastening/guiding piece.

A cover 29 surrounds the fastening/guiding piece 19, 20 and snaps on the outside of the wings 20 of this piece. This cover 29 includes a bottom opening allowing the passage of the shoe 23.

Figure 5:
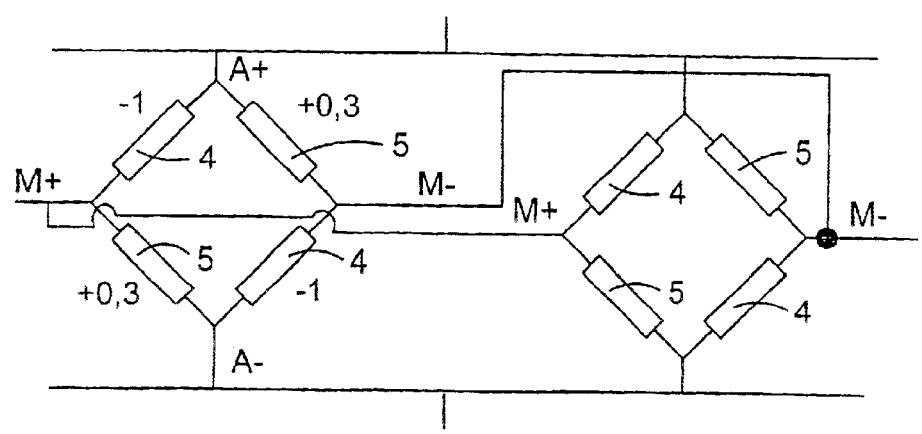
FIG. 5 represents, schematically, a measuring bridge, formed by the resistors of the strain gauges of the weighing apparatus.
Figure 3:
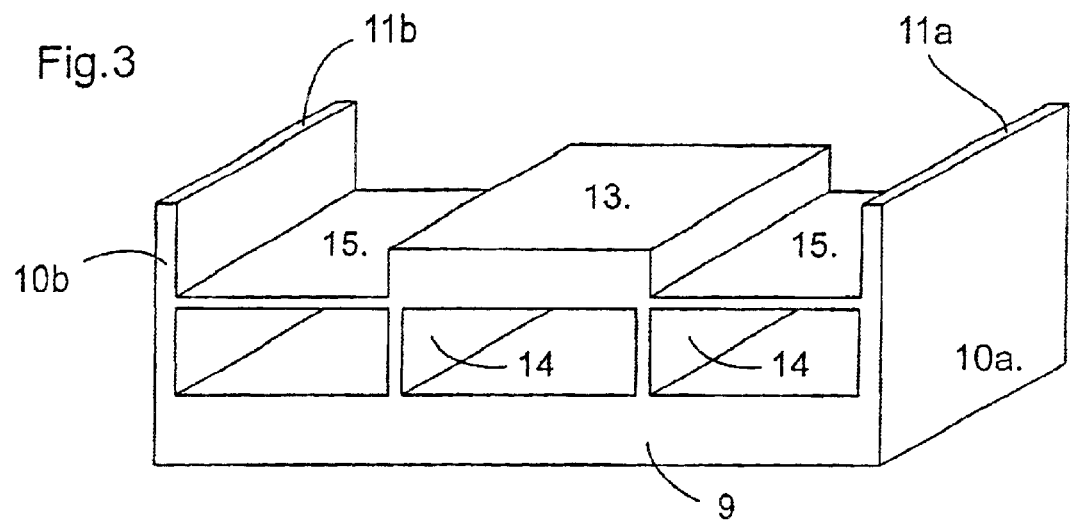
FIG. 3 is a side view of the proof body, when not subjected to any strain.

The resistors 4, 5 of the strain gauges of each foot 2 are mounted in a Wheatstone bridge as illustrated in FIG. 5. The four resistors of two feet form a bridge and one thus obtains two bridges which are mounted in parallel. At the output of the whole bridge, an output signal M is obtained, of which the value is in direct proportion to the weight placed on the plate 1 of the weighing apparatus. This measurement signal M is processed and is used for controlling the display 6. In alternate versions, the display can be placed differently, it can be at a distance from the weighing apparatus proper, the plate 1 and the feet 2, to be placed on a wall or in some control premises.

In an alternate version, the apparatus could have only three feet, thus ensuring its stability even on an uneven ground. In this case, each foot would include a set of four strain gauges arranged in a Wheatstone bridge.

What is claimed is:

1. A proof body for a weighing apparatus, characterised in that it is comprised of a profiled segment and in that it includes a measuring beam (9) joined via each one of its ends with a respective wing (10*a*, 10*b*) which extends substantially perpendicularly with respect to the measuring beam (9) and of which the free side faces (11*a*, 11*b*) provide abutment faces; and in that it further includes an abutment beam (13) parallel to the measuring beam (9) and connected thereto by means of two ribs (14), this abutment beam (13) being also connected to each one of the wings (10*a*, 10*b*) by a web (15) which is substantially parallel to the measuring beam (9).

2. A proof body according to claim 1, characterised in that the free face of the measuring beam (9) is provided with, at least, one strain gauge operating in compression.

3. A weighing apparatus, characterised in that it includes a plate (1) and, at least, three proof bodies according to claim 1, which abut directly or indirectly through their abutment side faces (11*a*, 11*b*) against the lower face of this plate (1) and in that is further includes shoes (23) which are mounted slidably and perpendicularly with respect to the plate (1) and which are designed for resting on the ground or on a surface and for abutting against the underside of the abutment beam (13) of the proof body.

4. A weighing apparatus according to claim 3, characterised in that it includes, at least, three feet having each one a base plate (19) which is joined to the lower face of the plate (1) and which carries two fastening pieces (20) extending perpendicularly to the base plate (19) and ending by hooks (21) designed for maintaining a proof body (3), in the service position, abutting against the base plate (19); and in that each foot further includes a shoe (23) joined to two columns (24) connected together through a strut (25) extending between the measuring beam (9) and the abutment beam (13), this strut (25) abutting against the lower side of the abutment beam (13) via a ball (16).

5. A weighing apparatus according to claim 4, characterised in that each foot further includes a cover (29) arranged on the fastening/guiding pieces (19, 20) and allowing the passage of the shoe (23).

6. A weighing apparatus according to claim 5, characterised in that each foot further includes guiding rods (22) joined to the base plate (19) and co-operating with passages (28) arranged in the ends of the strut (25).

* * * * *